(12) United States Patent
Nagata et al.

(10) Patent No.: US 8,279,393 B2
(45) Date of Patent: Oct. 2, 2012

(54) LIQUID CRYSTAL DISPLAY DEVICE

(75) Inventors: Tetsuya Nagata, Mobara (JP);
Takeharu Furusawa, Mobara (JP);
Shigeki Nishizawa, Mobara (JP);
Hitoshi Azuma, Yokohama (JP);
Susumu Sasaki, Chiba (JP); Masataka Okamoto, Chonan (JP)

(73) Assignees: Hitachi Displays, Ltd., Chiba (JP);
Panasonic Liquid Crystal Display Co., Ltd., Hyogo-ken (JP)

( * ) Notice: Subject to any disclaimer, the term of this patent is extended or adjusted under 35 U.S.C. 154(b) by 395 days.

(21) Appl. No.: 12/720,775

(22) Filed: Mar. 10, 2010

(65) Prior Publication Data
US 2010/0231841 A1 Sep. 16, 2010

(30) Foreign Application Priority Data
Mar. 13, 2009 (JP) ................................. 2009-060643

(51) Int. Cl.
*G02F 1/1339* (2006.01)

(52) U.S. Cl. ...................................................... 349/153
(58) Field of Classification Search .................. 349/153
See application file for complete search history.

(56) References Cited

U.S. PATENT DOCUMENTS

| | | | | |
|---|---|---|---|---|
| 5,184,239 A | * | 2/1993 | Sano et al. | 349/154 |
| 5,307,190 A | * | 4/1994 | Wakita et al. | 349/158 |
| 7,102,602 B2 | * | 9/2006 | Kim et al. | 345/87 |
| 7,169,636 B2 | * | 1/2007 | Maruyama et al. | 438/99 |
| 7,705,959 B2 | * | 4/2010 | Kim et al. | 349/158 |
| 7,834,962 B2 | * | 11/2010 | Satake et al. | 349/110 |
| 2009/0096965 A1 | * | 4/2009 | Nagata | 349/103 |

* cited by examiner

*Primary Examiner* — Timothy L Rude
(74) *Attorney, Agent, or Firm* — Antonelli, Terry, Stout & Kraus, LLP.

(57) ABSTRACT

As shown in the figures, the main surface of the first substrate and the main surface of the second substrate are bent in the liquid crystal display device according to the present invention, where a sealing material is provided outside the display region and has a protrusion formed in at least one corner of the display region, and the distance between the side of the display region facing the protrusion and the sealing material is greater than the distance between the portion of the side and the sealing material where there is no protrusion.

12 Claims, 13 Drawing Sheets

PRIOR ART

FIG. 2B

PRIOR ART

FIG. 2C

PRIOR ART

FIG. 2D

PRIOR ART

FIG. 3A

PRIOR ART

PRIOR ART

PRIOR ART

FIG.9B

PRIOR ART

LIQUID CRYSTAL DISPLAY DEVICE

CROSS-REFERENCE TO RELATED APPLICATION

The present application claims priority over Japanese Application JP2009-060643 filed on Mar. 13, 2009, the contents of which are hereby incorporated into this application by reference.

BACKGROUND OF THE INVENTION (1) Field of the Invention

The present invention relates to a liquid crystal display device, and in particular, to a bendable liquid crystal display device.

(2) Description of the Related Art

Liquid crystal display devices are formed of a pair of substrates that sandwich liquid crystal and a backlight, and the main surface of the pair of substrates has a display region where a number of pixels are formed. These pixels are formed so that they independently generate an electrical field for driving liquid crystal molecules, and thus have a light transmission matching the drive of the molecules of the liquid crystal.

In addition, IPS (in-plane switching) mode liquid crystal display devices are provided with pixel electrodes and common electrodes on one of the pair of substrates, on the liquid crystal side, so that liquid crystal molecules are driven by an electrical field having a component that is parallel to the main surface of the substrate between the pixel electrodes and the common electrodes. These liquid crystal display devices are known to be able to provide so-called wide view angle display. They are in some cases referred to as lateral electrical field mode, because of the peculiarity of the application of an electrical field the liquid crystal.

Thus, some lateral electrical field mode liquid crystal display devices have the minimum light transmission (black display) when no electrical field is applied to the liquid crystal, and provide such display that the light transmission increases as the electrical field is applied (hereinafter sometimes referred to as normally black display).

In addition, liquid crystal display devices where very thin glass substrates or plastic substrates are used for the pair of substrates so that the display surface is bendable are also known.

SUMMARY OF THE INVENTION

Here, in the case where the display surface of the above described liquid crystal display device is bent, light passing, which can be seen as whitish display in the corners of the display region in a state of black display, can be confirmed.

Figure 9A:
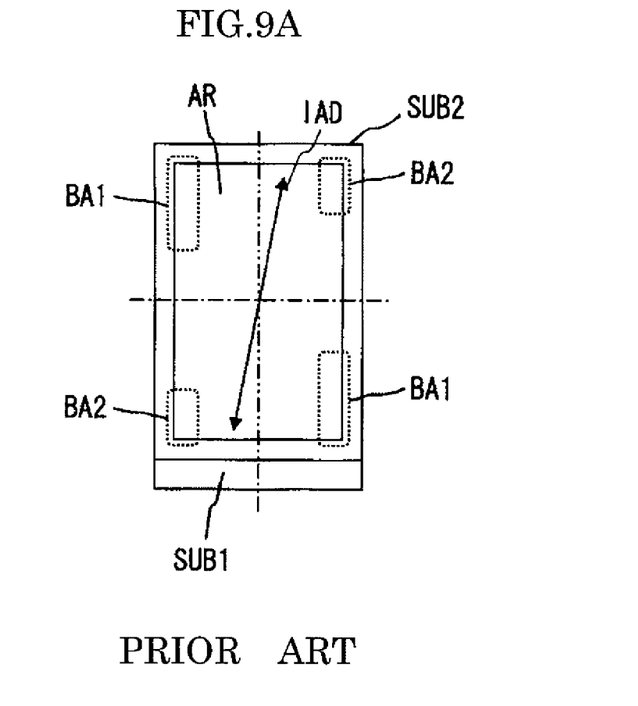
FIGS. 9A and 9B are schematic diagrams showing the configuration of a conventional liquid crystal display device.
Figure 9B:
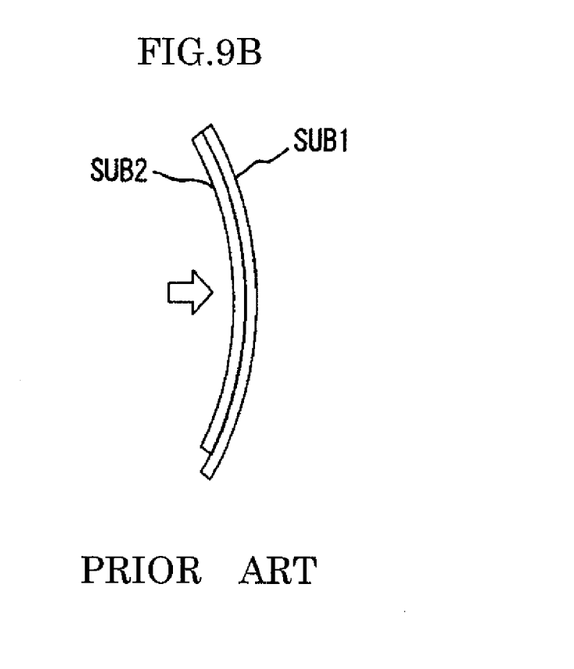

FIGS. 9A and 9B show such a liquid crystal display device: FIG. 9A is a front diagram and FIG. 9B is a cross sectional diagram along the center line; that is, the two-dot chain line in FIG. 9A. As for the description of the configuration shown in FIGS. 9A and 9B, only a brief summary is provided here. This is because one embodiment of the present invention is described below in reference to diagrams corresponding to FIGS. 9A and 9B as other configurations are described.

The liquid crystal display device in FIG. 9A is provided with substrates SUB1 and SUB2, which are positioned so as to face each other and sandwich liquid crystal (not shown), and the liquid crystal is sealed by means of a sealing material (not shown) between the substrates SUB1 and SUB2. The region where a great number of pixels (not shown) are formed in a matrix within the region surrounded by the sealing material forms a display region AR. Here, IAD in FIG. 9A is the direction in which liquid crystal molecules are initially aligned, as described below. This liquid crystal display panel is in such a state that it is bent with a curvature radius of 150 mm, for example, as shown in FIG. 9B. In this case, a problem arises, such that there is light passing, with whitish display in the corners (within the dotted line frames BA1 and BA2 in FIG. 9A, hereinafter referred to as corners BA1 and BA2) of the display region AR, for example.

The present invention is provided in view of these problems, and an object of the present invention is to provide a liquid crystal display device where it is possible to prevent light passing in the display region at the time of black display.

A typical invention from among those disclosed in the present specification is briefly summarized below.

The present invention provides a liquid crystal display device comprising a first substrate in rectangular form, a second substrate in rectangular form that is positioned so as to face the above described first substrate, liquid crystal that is sandwiched between the above described first substrate and the above described second substrate, a display region in rectangular form where a number of pixels are formed, and a sealing material for securing the above described first substrate and the above described second substrate to each other and sealing the above described liquid crystal, characterized in that a main surface of the above described first substrate and a main surface of the above described second substrate are bent, the above described sealing material is provided outside the above described display region and forms a protrusion in at least one corner of the above described display region, and the distance between the side of the above described display region facing the above described protrusion and the above described sealing material is greater than the distance between the portion of the above described side and the above described sealing material where there is no protrusion.

In addition, the above described protrusion may be formed in at least one corner on the side of the diagonal line of the above described display region of which the angle at which the diagonal line crosses the direction in which the above described liquid crystal is initially aligned is greater. Furthermore, the above described protrusion may be formed in two corners on the side of the diagonal line of which the crossing angle is greater.

According to the present invention, light passing can be prevented in the display region of the liquid crystal display device at the time of black display.

DETAILED DESCRIPTION OF THE INVENTION

In the following, embodiments of the present invention are described in reference to the drawings. Here, the same symbols are used for components that are the same, and descriptions that are the same are not repeated.

First Embodiment

Entire Configuration

Figure 1:
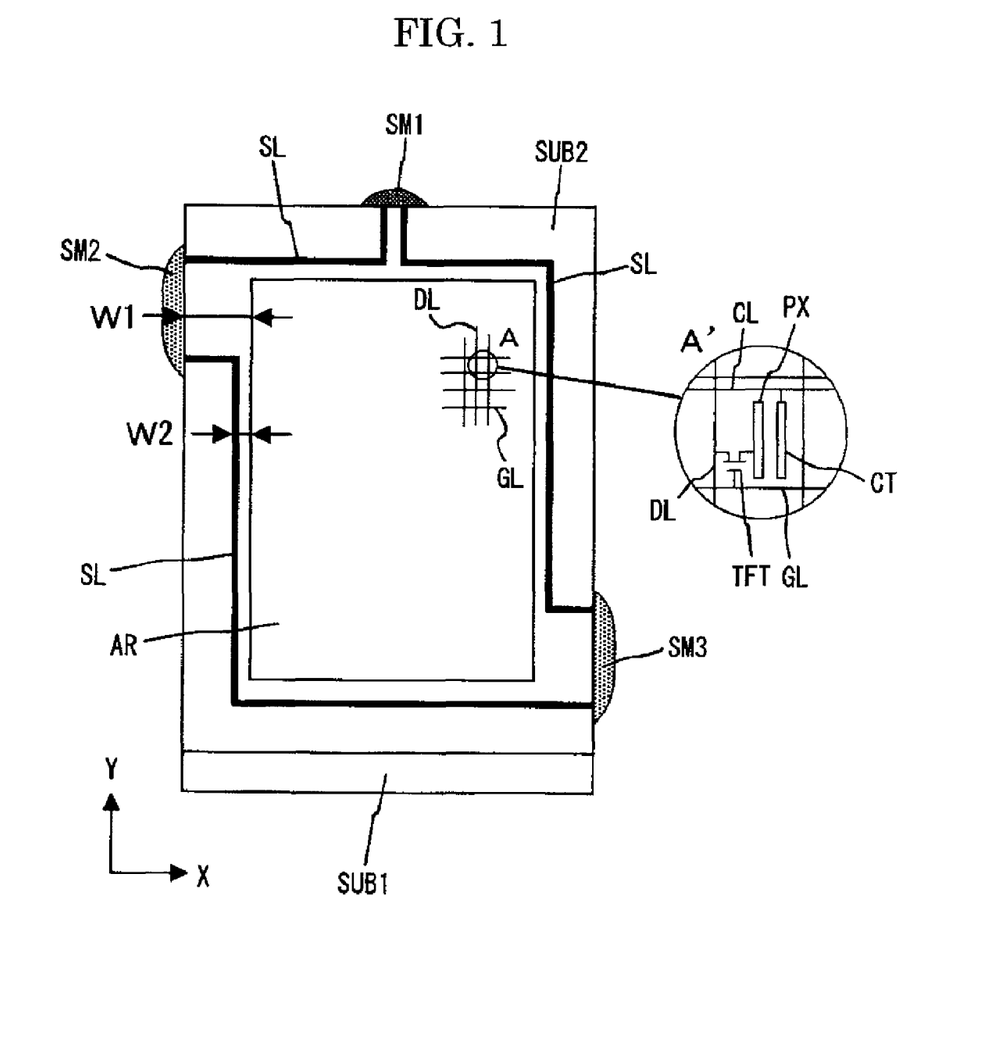
FIG. 1 is a schematic plan diagram showing the configuration of the liquid crystal display device according to the first embodiment of the present invention.

FIG. 1 is a schematic plan diagram showing the configuration of the liquid crystal display device according to the first embodiment of the present invention. In addition, in the present specification, a first sealing material SL and a second sealing material SM1 to SM3 collectively form a sealing material.

As shown in FIG. 1, the liquid crystal display device according to the first embodiment has a liquid crystal display panel formed of a first substrate (substrate on TFT side) SUB1 where pixel electrodes are formed, a second substrate (substrate on CF side) SUB2 that is positioned so as to face the first substrate SUB1, on which the below described color filters and black matrix (light blocking film) are formed, and liquid crystal, not shown, which is sandwiched between the first substrate SUB1 and the second substrate SUB2. When this liquid crystal display panel is combined with a backlight unit, not shown, which becomes the light source, a liquid crystal display device can be provided. The first substrate SUB1 and the second substrate SUB2 are secured to each other (pasted together), and the liquid crystal sandwiched between the two substrates SUB1 and SUB2 is sealed by the sealing material, described in detail below, around the display region AR in the structure. In the following description, liquid crystal display devices may include liquid crystal display panels.

Glass substrates formed through chemical polishing so as to be thin to a thickness of 0.125 mm, for example, are used for the first substrate SUS1 and the second substrate SUB2. When a liquid crystal display device is formed of a first substrate SUB1 and a second substrate SUB2 made of these glass substrates, the liquid crystal display device is bendable and makes display on a curved surface with a curvature radius of 150 mm possible, for example. Here, it is desirable for the thickness of the glass substrates to be 0.2 mm or less, in order to implement a bendable liquid crystal display device using glass substrate. The thickness is more desirably 0.125 mm or less, as described above. Here, the first substrate SUB1 and the second substrate SUB2 are not limited to glass substrates as those described above, and glass substrates having a different thickness or other insulating substrates made of crystal glass or plastic may be used. When crystal glass is used, for example, the temperature can be set high during processing, so that the density of the below described gate insulating films is higher and the reliability of the below described thin film transistors TFT is high. In addition, when plastic substrates are used, a lightweight, highly bendable liquid crystal display device having high resistance to impact can be provided. Furthermore, the first substrate SUB1 and the second substrate SUB2 are not limited to substrates having the same thickness, and the two may have a different thickness.

In addition, in the liquid crystal display device according to the first embodiment, the region where display pixels (hereinafter referred to as pixels) are formed within the region in which liquid crystal is sealed is the display region AR and the outermost side of the display region AR is referred to as the outermost edge of the display region. In addition, the region where no pixels are formed and there is no display is excluded from the display region AR even within the region in which liquid crystal is sealed.

Furthermore, in the liquid crystal display device according to the first embodiment, low temperature polysilicon (LTPS) is used for the thin film transistors TFT and a video signal drive circuit (drain driver), not shown, and a scan signal drive circuit (gate driver), also not shown, are formed on the first substrate SUB1 in the structure. Here, in the case where it is not particularly necessary to distinguish between the drain driver and the gate driver in the following description, the two are simply referred to as drive circuits (drivers).

As shown in FIG. 1, in the liquid crystal display device according to the first embodiment, scan lines (gate signal lines) GL are formed so as to extend in the direction X and be aligned in the direction Y in the figure within the display region AR on the surface of the first substrate SUB1 on the liquid crystal side. In addition, video signal lines (drain signal lines) DL are formed so as to extend in the direction Y and be aligned in the direction X in the figure.

Pixels are formed in the region in rectangular form surrounded by the drain signal lines DL and the gate signal lines GL, and as a result, pixels are aligned in a matrix within the display region AR in the structure. As shown in the circle A', which is an enlargement of the circle A in FIG. 1, each pixel is provided with a thin film transistor TFT that can be turned on by a scan signal from the gate signal line GL, a pixel electrode PX to which a video signal is supplied from the drain signal line DL via the thin film transistor TFT when turned on, and a common electrode CT which is connected to a common signal line CL and to which a reference signal having a potential that is the reference for the potential of the video signal is supplied, for example. An electrical field having a component that is parallel to the main surface of the first substrate SUB1 is generated between the pixel electrode PX and the common electrode CT, so that the electrical field drives the liquid crystal molecules. Such liquid crystal display devices are known as being able to provide so-called wide view angle display, and referred to as IPS mode or lateral electrical field mode, because of the peculiarity of the application of an electrical field to the liquid crystal. In addition, liquid crystal display devices having such a configuration provide a normally black display, where the light transmission is minimum (black display) when no electrical field is applied to the liquid crystal, and light transmission increases as a higher electrical field is applied.

Here, though a reference signal is inputted in a common electrode CT formed independently for each pixel via a common signal line CL in the structure of the common electrode CT shown in the enlargement A', the invention is not limited to this, and common electrodes CT may be formed in a plane covering a number of pixels, for example.

In addition, in the first embodiment, drain signal lines DL and gate signal lines GL respectively extend over the sealing material in the end portions so as to be connected to a drain driver and a gate driver, not shown, in the structure. Here, the drain driver and the gate driver, which are drivers for a liquid crystal display device, are formed of LTPS on the first substrate SUB1 in the structure, as described above. A control signal including a drive signal for the drain driver and the gate driver is inputted in the drain driver and the gate driver from the outside via a flexible printed circuit board, not shown.

Next, the structure of the sealing material according to the present invention is described in reference to FIG. 1. As shown in FIG. 1, the sealing material in the first embodiment is formed of a first sealing material SL made of a known material applied outside the display region AR and a second sealing material SM1 to SM3 for closing the openings in the first sealing material SL. In the liquid crystal display device according to the first embodiment, in particular, the opening created in the center of the upper end of the first sealing material SL in the figure is used to inject liquid crystal. In addition, protrusions are formed of the second sealing material in the lower right and upper left in the figure. In the structure in FIG. 1, the protrusions are formed of the portion with an opening in the first sealing material SL and the second sealing material SM2 and SM3, and the opening in the sealing material SL is not used to inject liquid crystal in the structure. In addition, in the liquid crystal display device according to the first embodiment, the second sealing material SM1 is made of the same material as the second sealing material SM2 and SM3. Here, the second sealing material SM1, SM2 and SM3 are not limited to being of the same material, and different sealing materials may be used. This is possible because the sealing material SM2 and SM3 do not make contact with the liquid crystal before curing in the case where liquid crystal is injected through the opening in the first sealing material SL at the upper end in the figure and the opening is sealed with the second sealing material SM1 after the openings in the first sealing material SL created in the lower right and upper left in the figure are closed by the second sealing material SM2 and SM3, for example.

In addition, as described below, in the liquid crystal display device according to the first embodiment, the direction in which liquid crystal molecules are initially aligned is set to incline by 10° relative to the drain signal lines DL. The direction in which the liquid crystal molecules are initially aligned can be set by adjusting the direction in which the alignment film, not shown, formed on the surface of the first and second substrates SUB1 and SUB2 that make contact with the liquid crystal is rubbed. The direction in which liquid crystal molecules are initially aligned is known to be affected by the intensity of light that passes through the corner portions of the liquid crystal display region AR in the case where the liquid crystal display device is bent, as described below.

As shown in FIG. 1, the first sealing material SL is patterned so that openings are created in the lower right and upper left of the liquid crystal display device, and the openings are closed by the second sealing material SM2 and SM3 in the structure, and thus, the amount of light that passes through can be reduced in the corner BA1 in FIG. 9A, or the state can be made such that light passing is not visible even when the liquid crystal display device is bent, as in FIG. 9B.

As described above, the amount of light that passes through in the corner BA1 of the liquid crystal display region AR is reduced because the distance W1 between the outermost edge of the display region AR and the second sealing material SM2 and SM3 in the corner BA1 is greater than the distance W2 between the outermost edge of the display region AR and the second sealing material SM2 in regions other than the corner BA1, and thus, stress can be reduced in the corner BA1 when the liquid crystal display device is bent. That is to say, the distance between the side of the display region that faces the protrusion of the second sealing material and the second sealing material (second sealing material SM2 and SM3 in the first embodiment) is greater than the distance between the portion of the above described side and the first sealing material (first sealing material SL in the first embodiment), where there are no protrusions, and thus, it is possible to reduce light passing.

Figure 3A:
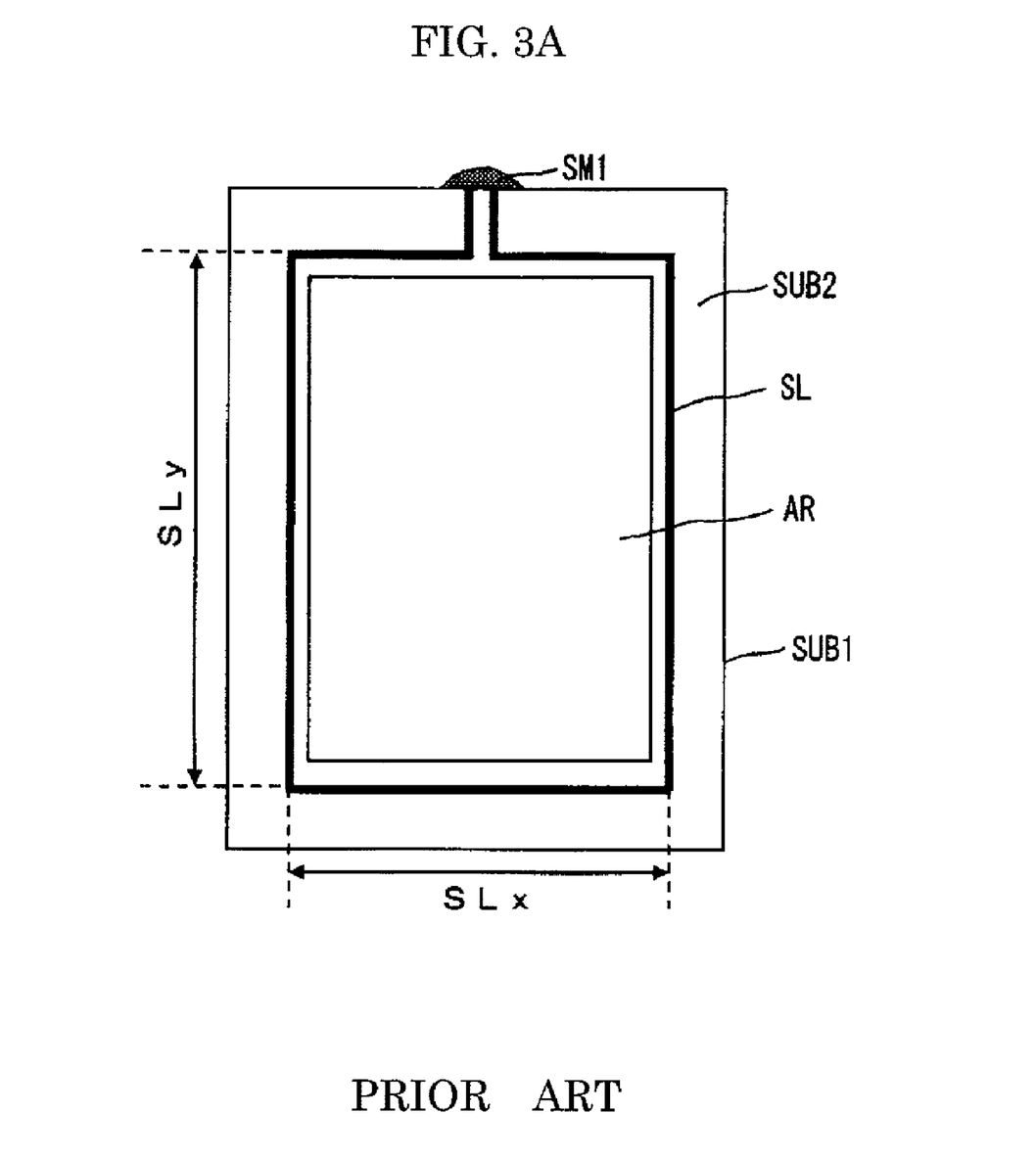
FIGS. 3A and 3B are diagrams for illustrating the effects of the liquid crystal display device according to the first embodiment of the present invention.

FIGS. 3A to 4E are diagrams for illustrating the effects of the liquid crystal display device according to the first embodiment of the present invention. Specifically, FIG. 3A is a schematic diagram showing the configuration of the liquid crystal display device having a conventional sealing material pattern prepared for comparison, and FIG. 3B is a schematic diagram showing the configuration of the liquid crystal display device having a sealing material pattern according to the first embodiment. In addition, FIG. 4A is a schematic diagram showing the amount of light that passes through in the liquid crystal display device having a conventional sealing material pattern, and FIGS. 4B to 4E are schematic diagrams showing the amount of light that passes through in the liquid crystal display device having a sealing material pattern according to the first embodiment. Here, the dotted line regions A1 and A2 in FIGS. 4A to 4E correspond to the sides of the light passing region. In addition, in FIGS. 4A to 4E, the sealing material (that is to say, the first sealing material and the second sealing material) is omitted in order to clearly show the size of the light passing region, and the points where there are openings in the sealing material are shown by OP1 and OP2 in the figure.

Figure 3B:
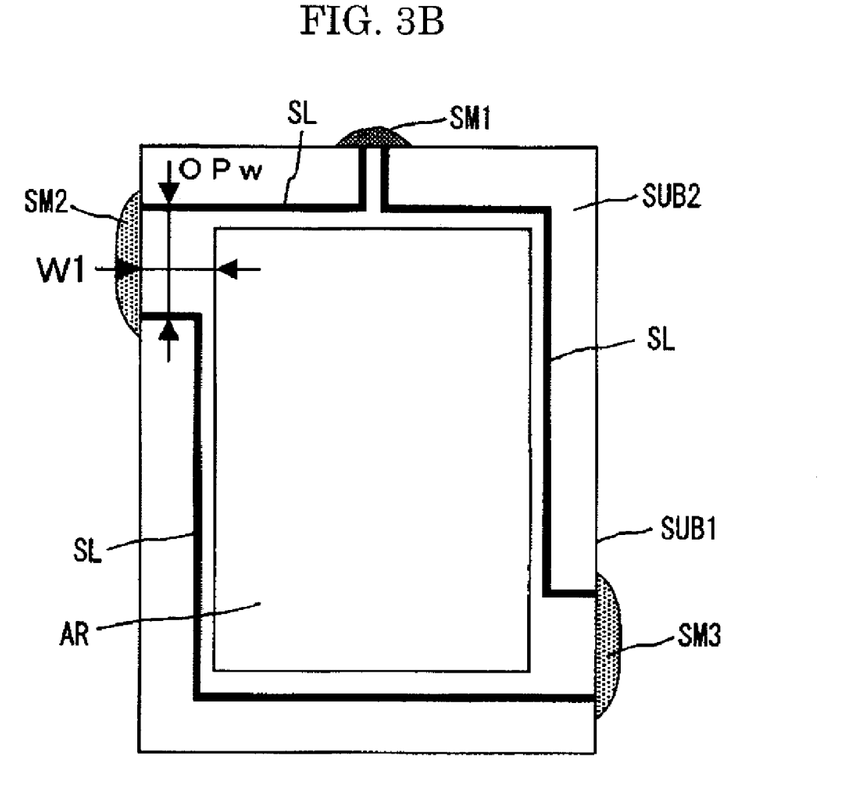
Figure 4A:
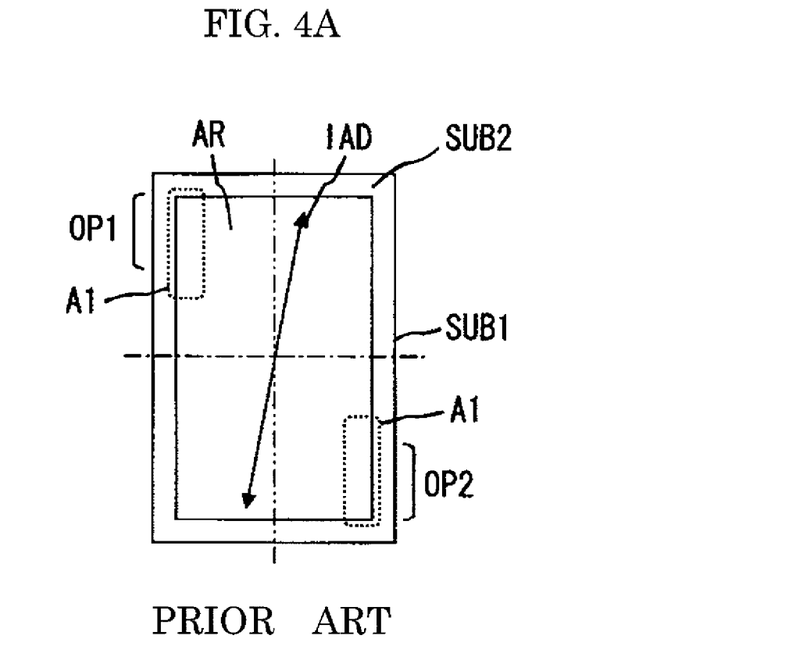
FIGS. 4A, 4B, 4C, 4D and 4E are diagrams for illustrating the effects of the liquid crystal display device according to the first embodiment of the present invention.

In the liquid crystal display device having the pattern of a conventional sealing material SL in FIGS. 3A and 3B, there is visible light passing in relatively large regions A1 in the upper left and lower right in the figure when the liquid crystal display device is bent, as shown in FIG. 4A.

In contrast, as shown in FIGS. 4B to 4E, reduction and prevention of light passing are possible in the liquid crystal display device according to the first embodiment of the present invention by use of the structure shown in FIG. 3B.

Figure 4B:
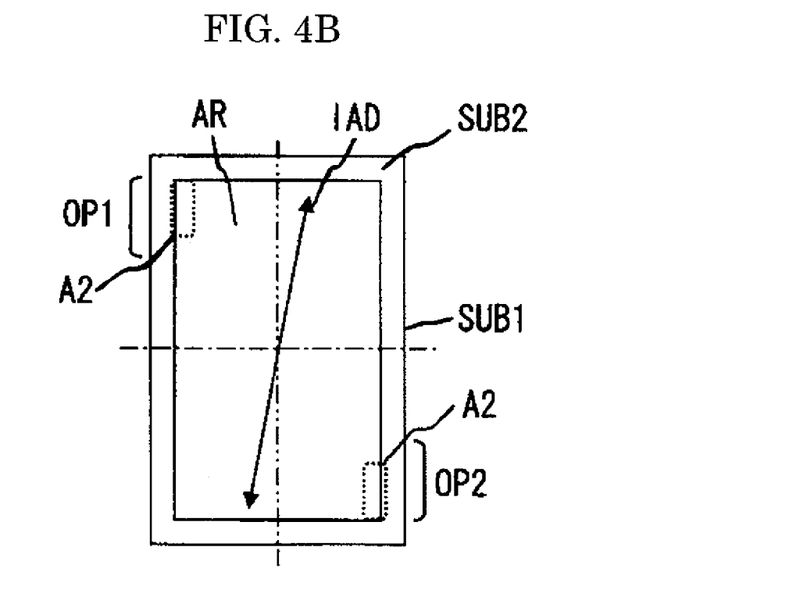
Figure 4C:
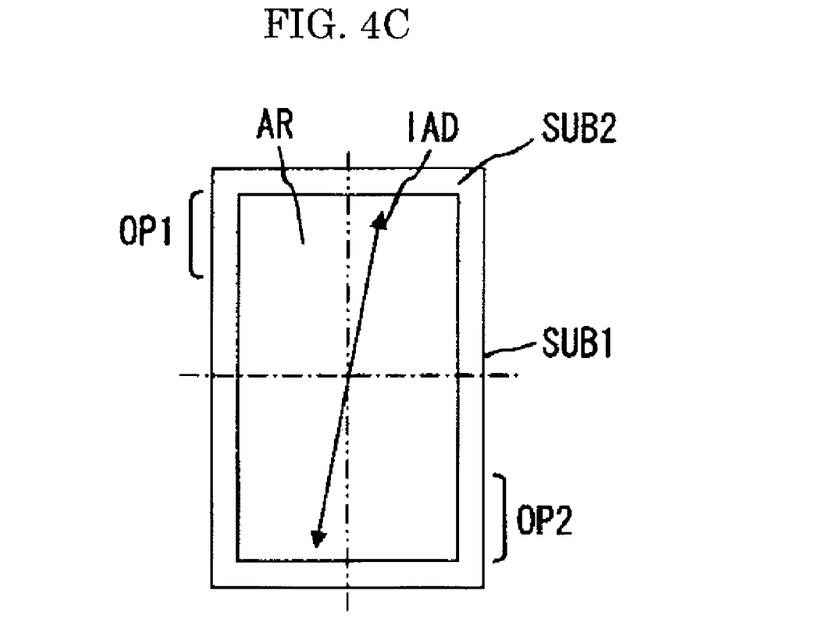
Figure 4D:
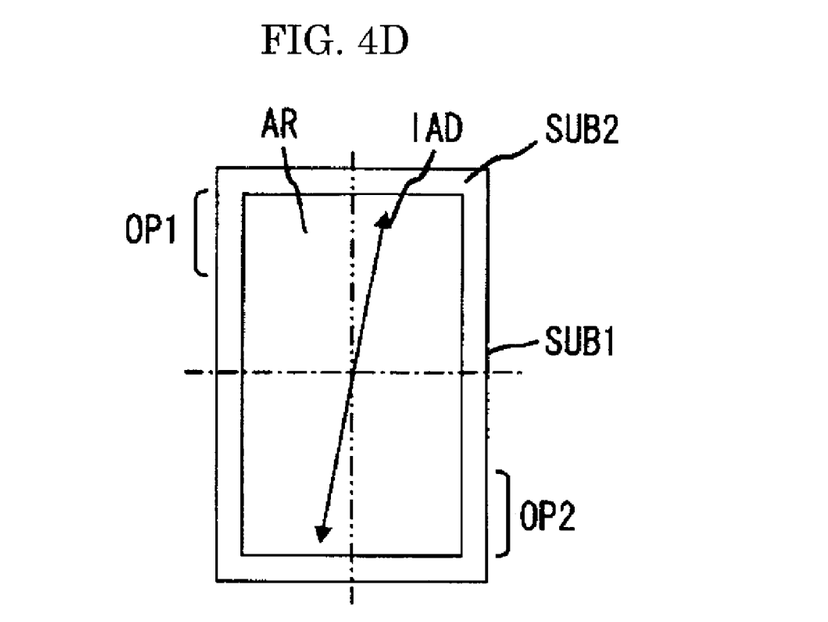
Figure 4E:
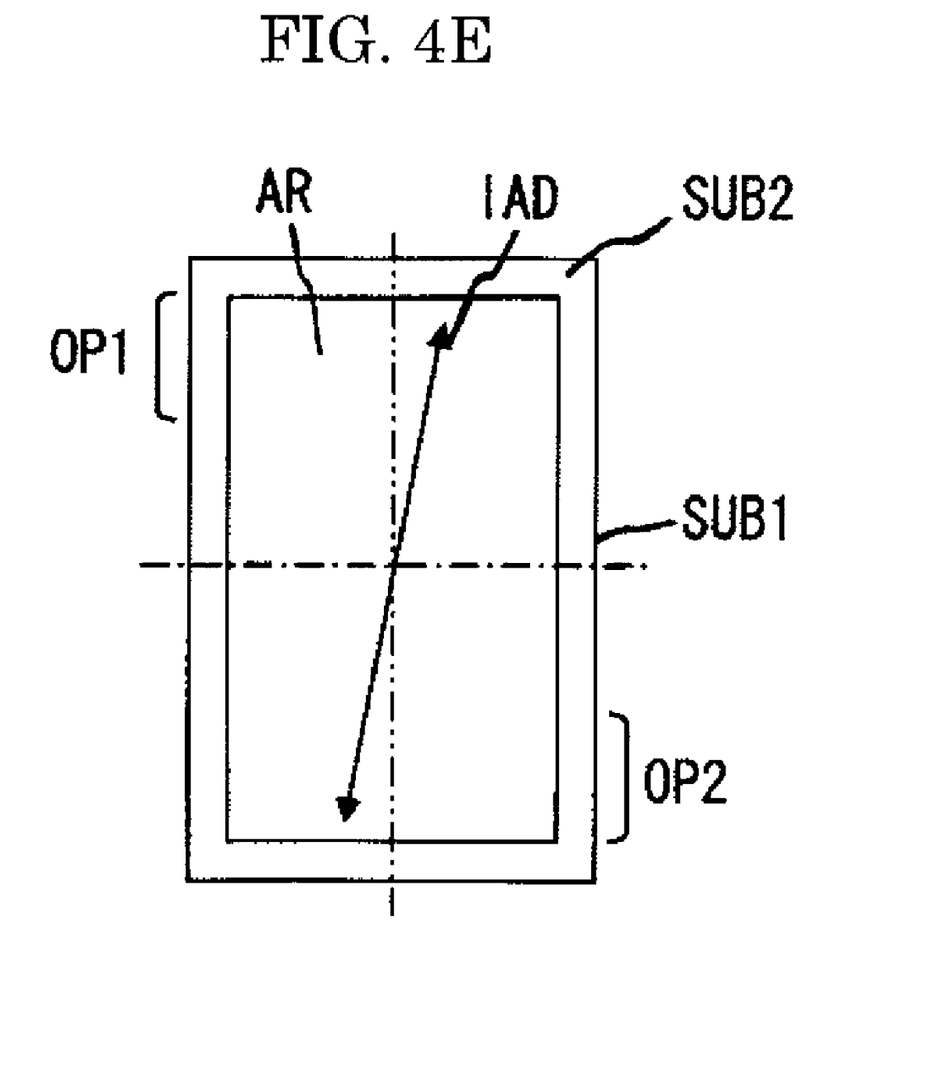

Here, FIGS. 4A to 4E show the results of observation in the case where the length SLx of the sealing material SL pattern in the lateral direction is approximately 40 mm, the length SLY in the longitudinal direction is approximately 65 mm, and the width OPw of the opening is approximately 15 mm in FIGS. 3A and 3B. In addition, FIG. 4B shows a case where W1=1.5 mm, and though there is visible light passing in the region A2, which is smaller than the region A1, the openings OP1 and OP2 allow the size of the region where there is light passing and the amount of light that passes through to be greatly reduced in comparison with in the prior art. In addition, FIG. 4C shows a case where W1=3.1 mm and openings OP1 and OP2 allow light passing to be reduced to such an extent that there is no visible light passing. In addition, FIG. 4D shows a case where W1=6 mm and FIG. 4E shows a case where W1=9 mm, and in these cases also, it is possible to reduce light passing to such an extent that there is no visible light passing.

As is clear from the above, in the liquid crystal display device according to the first embodiment, the distance W1 between the outermost edge of the display region AR and the second sealing material SM2 is greater than the distance W2 between the outermost edge of the display region AR and the first sealing material SL in regions other than in the corner BA1 in the structure, and thus, light can be prevented from passing in the corner BA1.

<Principle and Effects>

Figure 2A:
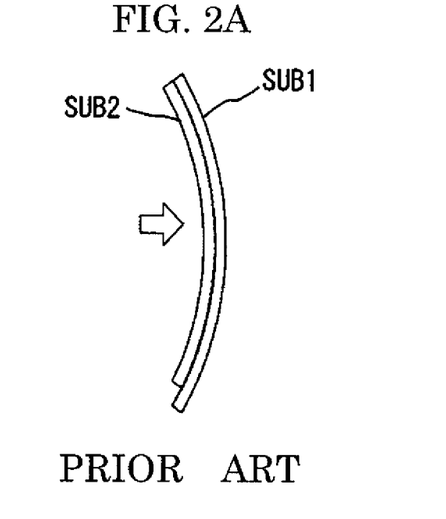
FIGS. 2A, 2B, 2C and 2D are diagrams for illustrating the effects of stress when a conventional liquid crystal display device is bent.
Figure 2B:
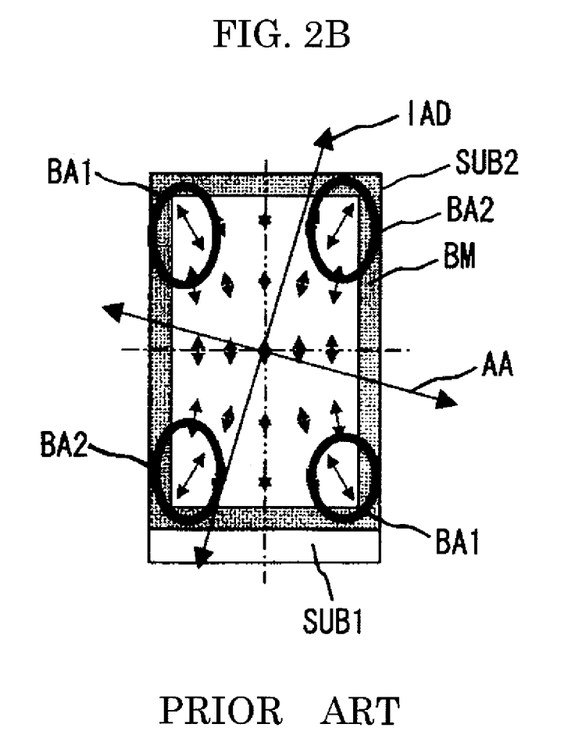
Figure 2C:
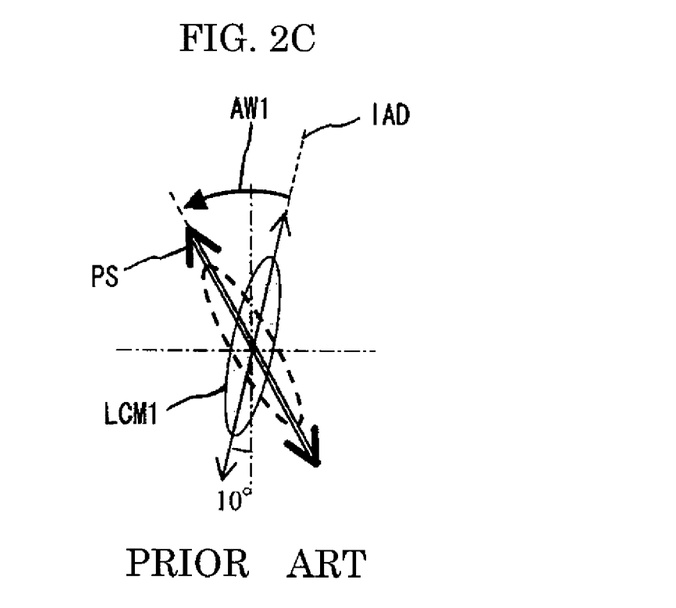
Figure 2D:
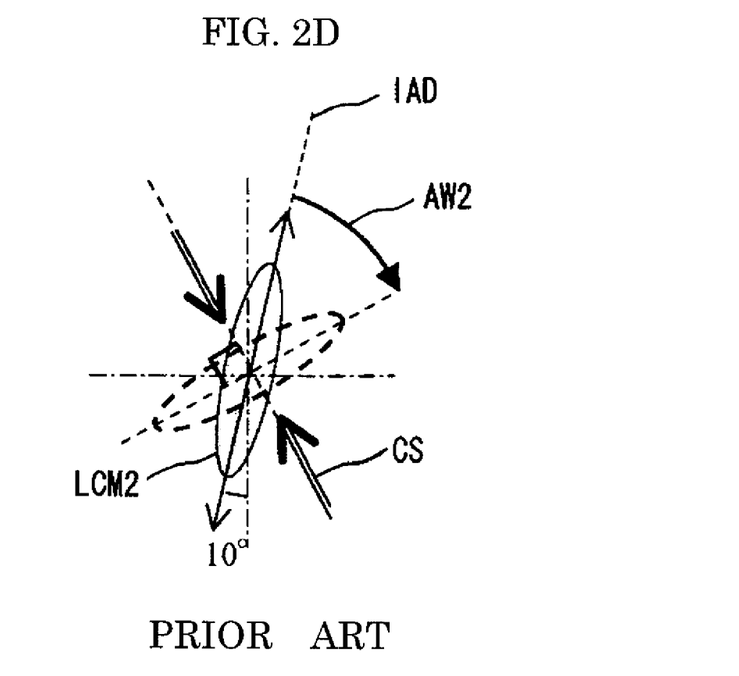

FIGS. 2A to 2D are diagrams for illustrating the effects of stress on liquid crystal molecules in the case where a conventional liquid crystal display device is bent. FIG. 2A is a side diagram showing a conventional liquid crystal display device in a bent state, FIG. 2B is a diagram showing the distribution of stress in the liquid crystal display device in a bent state, FIG. 2C is a diagram for illustrating the effects of stress on an alignment film formed on a conventional first substrate on the liquid crystal side, and FIG. 2D is a diagram for illustrating the effects of stress on the alignment film formed on a conventional second substrate on the liquid crystal side.

As shown in FIG. 2B, the stress distribution on the surface of the display region AR in the liquid crystal display device is as shown by the arrows in the figure. Concerning the arrows in FIG. 2B, the directions correspond to the direction of the stress and the length corresponds to the intensity of the stress. Accordingly, as is clear from FIG. 2B, there is little stress at the center of the surface of the display region AR, and there is much more, diagonal stress in the upper left and lower right corners BA1, as well as in the upper right and lower left corners BA2.

Here, light passes through in the regions indicated by dotted lines in the corners BA1 and BA2 in FIG. 9A, and as is clear from FIG. 9A, the amount of light that passes through in the corners BA1 is greater than the amount of light that passes through in the corners BA2. This is believed to be because the amount of light that passes through when the liquid crystal display device is bent relates to the direction IAD in which liquid crystal is initially aligned. The direction IAD in which liquid crystal is initially aligned in the liquid crystal display device in the present specification is inclined by 10° clockwise relative to the long side of the display region AR in the figure (direction in which drain signal lines DL extend). In this case, the effects of the stress on the liquid crystal molecules are believed to be relatively small in the corners BA2. In the case where the direction IAD in which liquid crystal is initially aligned is set the same as that in which the drain signal lines DL extend, the intensity of visible light passing is approximately the same between the corners BA1 and the corners BA2. Therefore, the direction IAD in which liquid crystal is initially aligned is set so as to incline relative to the direction in which the drain signal lines extend, so that effects can be gained such that the number of regions where there is light passing can be reduced within the display region AR.

Particularly in the corners BA1, where the amount of light that passes through is great, the stress when the liquid crystal display is bent pulls the alignment film, not shown, formed on the first substrate (substrate on the TFT side) SUB1 in the direction of the arrow PS in FIG. 4C (tensile stress). This tensile stress changes the direction in which liquid crystal molecules LCM1 are aligned on the first substrate SUB1 side to counterclockwise, as shown by the arrow AW1, from the initial alignment direction IAD to the direction PS of the tensile stress, and liquid crystal molecules in the vicinity are believed to follow as a result, so as to rotate counterclockwise.

In contrast, a compressing force (compressing stress) in the direction of the arrow CS in FIG. 4D (opposite to the tensile stress) is generated in the alignment film, not shown, formed on the second substrate (substrate on the CF side) SUB2. This compressing stress changes the direction in which liquid crystal molecules LCM2 are aligned on the second substrate SUB2 side to clockwise, as shown by the arrow AW2 (rotational direction opposite to that of liquid crystal molecules LCM1) from the initial alignment direction IAD to a direction perpendicular to the direction CS of the compressing stress, and liquid crystal molecules in the vicinity are believed to follow and rotate clockwise as a result. Such rotation of liquid crystal molecules provides alignment of the liquid crystal molecules sandwiched between the first substrate SUB1 and the second substrate SUB2 with a twist, that is to say, twist alignment.

Meanwhile, in the IPS display mode, a pair of polarizing plates, not shown, of which the absorption axes are perpendicular to each other are used, and the structure allows the absorption axis of one polarizing plate to be in the same direction as the initial alignment direction IAD of the liquid crystal (rubbing direction). This positional relationship is shown by the arrow IDA indicating the initial alignment direction and the arrow AA that is perpendicular to the arrow IDA of the initial alignment direction, as shown in FIG. 2B, for example. Here, the black display in the IPS display mode is provided by the polarizing plats that are perpendicular to each other, where the liquid crystal is in the initial alignment state, and in the case where the alignment of liquid crystal molecules is twist alignment following the curve, the liquid crystal becomes birefringent, which is believed to cause light to pass through (light leakage). Accordingly, in the present invention, the protrusions of the sealing material are formed as shown in FIG. 1; in other words, a certain distance (W1 in FIG. 1) is provided between the outermost edge of the display region AR and the second sealing material SM2 and SM3, and thus, stress applied to liquid crystal molecules in the corners BA1 can be reduced, and light can be prevented from passing through in the liquid crystal display device when it is bent.

In addition, in view of the relationship between the above described initial alignment direction of liquid crystal and light passing, it is desirable for the protrusions of the sealing material to be formed in at least one place in the corner on the side of the diagonal line in the display region where the angle at which the diagonal line crosses the initial alignment direction of the liquid crystal is greater.

Second Embodiment

Figure 5:
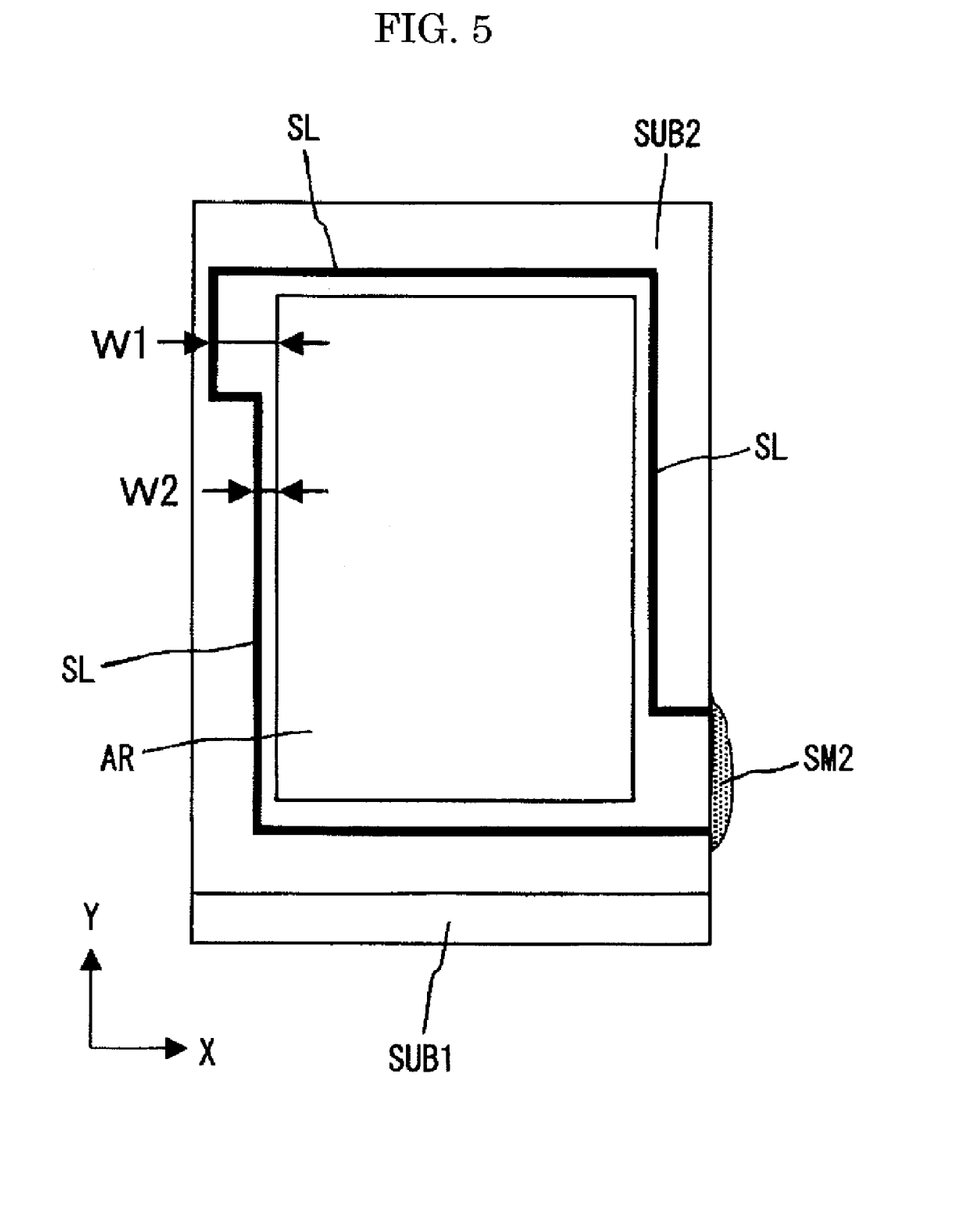
FIG. 5 is a schematic plan diagram showing the configuration of the liquid crystal display device according to the second embodiment of the present invention.

FIG. 5 is a schematic plan diagram showing the configuration of the liquid crystal display device according to the second embodiment of the present invention. Here, the liquid crystal display device according to the second embodiment shown in FIG. 5 is different from the liquid crystal display device according to the first embodiment only in the pattern of the sealing material formed of a first sealing material SL and a second sealing material SM, and the opening through which liquid crystal is injected and the rest of the structure is the same. Therefore, only the pattern of the sealing material and the opening through which liquid crystal is injected, which have a different structure, are described in detail below.

As shown in FIG. 5, the liquid crystal display device according to the second embodiment has such a structure that the sealing material is formed of a first sealing material SL that is applied on the outside of the display region AR and a second sealing material SM2 that closes the opening of the sealing material SL. In particular, the liquid crystal display device according to the second embodiment has such a structure that the opening of the first sealing material SL created in the lower right in the figure is the opening through which liquid crystal is injected, and in other regions, the first substrate SUB1 and the second substrate SUB2 are secured to each other by means of the first sealing material SL in annular form, so that liquid crystal can be sealed in.

In other words, the liquid crystal display device according to the second embodiment has such a structure that liquid crystal is injected through the opening in the first sealing material SL created in the lower right in the figure, and thus, the effects of the tensile stress and compressive stress in the alignment film when the liquid crystal display device is bent on the alignment film in the vicinity of the display region AR can be reduced.

Furthermore, the tensile stress and compressive stress in the alignment film when the liquid crystal display device is bent greatly affect the alignment film in the region diagonally opposite to the opening (upper left in the figure), as described above. Accordingly, in the liquid crystal display device according to the second embodiment, the first sealing material SL formed in the direction of the X axis in the upper portion of the display region AR extends beyond the display region, and has such a pattern as to bend along the Y axis (downward in the figure) before reaching the end of the first and second substrates SUB1 and SUB2 in the upper left in the figure, which is diagonally opposite to the opening. The thus formed first sealing material SL extends along the Y axis and bends toward the display region, AR, and further extends along the Y axis along the outermost edge of the display region. The first sealing material SL is patterned in this form, and thus, a region where the first sealing material SL deviates from its path (that is to say, the protrusion of the sealing material) is provided, and thus, the tensile stress and compressive stress on the alignment film in the vicinity of the display region AR when the liquid crystal display device is bent are reduced in the configuration.

As a result, it becomes possible to prevent light from passing through in the liquid crystal display device according to the second embodiment.

As described above, the liquid crystal display device according to the second embodiment also has such a structure that the distance between the outermost edge of the display region AR in the corner BA1 and the sealing material SM2 and the distance W1 between the outermost edge of the display region AR and the first sealing material SL are both greater than the distance W2 between the outermost edge of the display region AR and the first sealing material SL in regions other than in the corner BA1, and thus, light can be prevented from passing through in the corner BA1.

Third Embodiment

Figure 6:
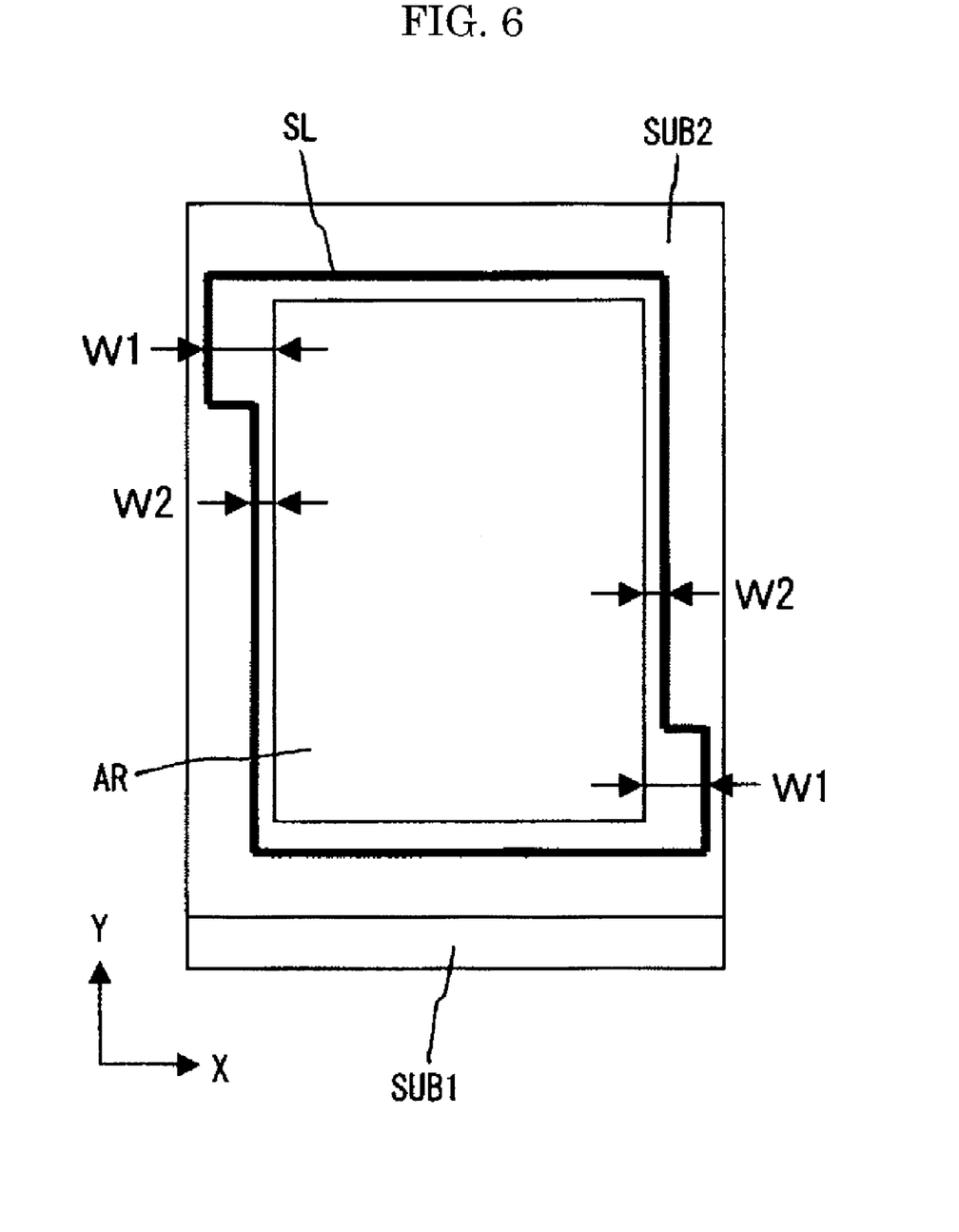
FIG. 6 is a schematic plan diagram showing the configuration of the liquid crystal display device according to the third embodiment of the present invention.

FIG. 6 is a schematic plan diagram showing the configuration of the liquid crystal display device according to the third embodiment of the present invention. Here, the liquid crystal display device according to the third embodiment shown in FIG. 6 has a structure where a well-known ODF (one drop fill) method is used for sealing in the liquid crystal, and the liquid crystal is sealed in and the first substrate SUB1 and the second substrate SUB2 secured to each other only using the first sealing material SL as the sealing material. Accordingly, only the pattern of the first sealing material SL is described in detail below.

As shown in FIG. 6, the liquid crystal display device according to the third embodiment has such a structure that the sealing material is formed of only the first sealing material SL, which is applied outside the display region AR. Accordingly, in the liquid crystal display device according to the third embodiment, the region where the first sealing material deviates from its path (that is to say, the protrusion of the sealing material) is formed in the upper left and lower right corners, which are opposite corners on a diagonal line, as in the upper left corner in FIG. 5.

As described above, the liquid crystal display device according to the third embodiment also has such a structure that the distance W1 between the outermost edge of the display region AR and the first sealing material SL in the corner is greater than the distance W2 between the outermost edge of the display region AR and the first sealing material SL in regions other than in the corner, and thus, light can be prevented from passing through in the corner.

Figure 7:
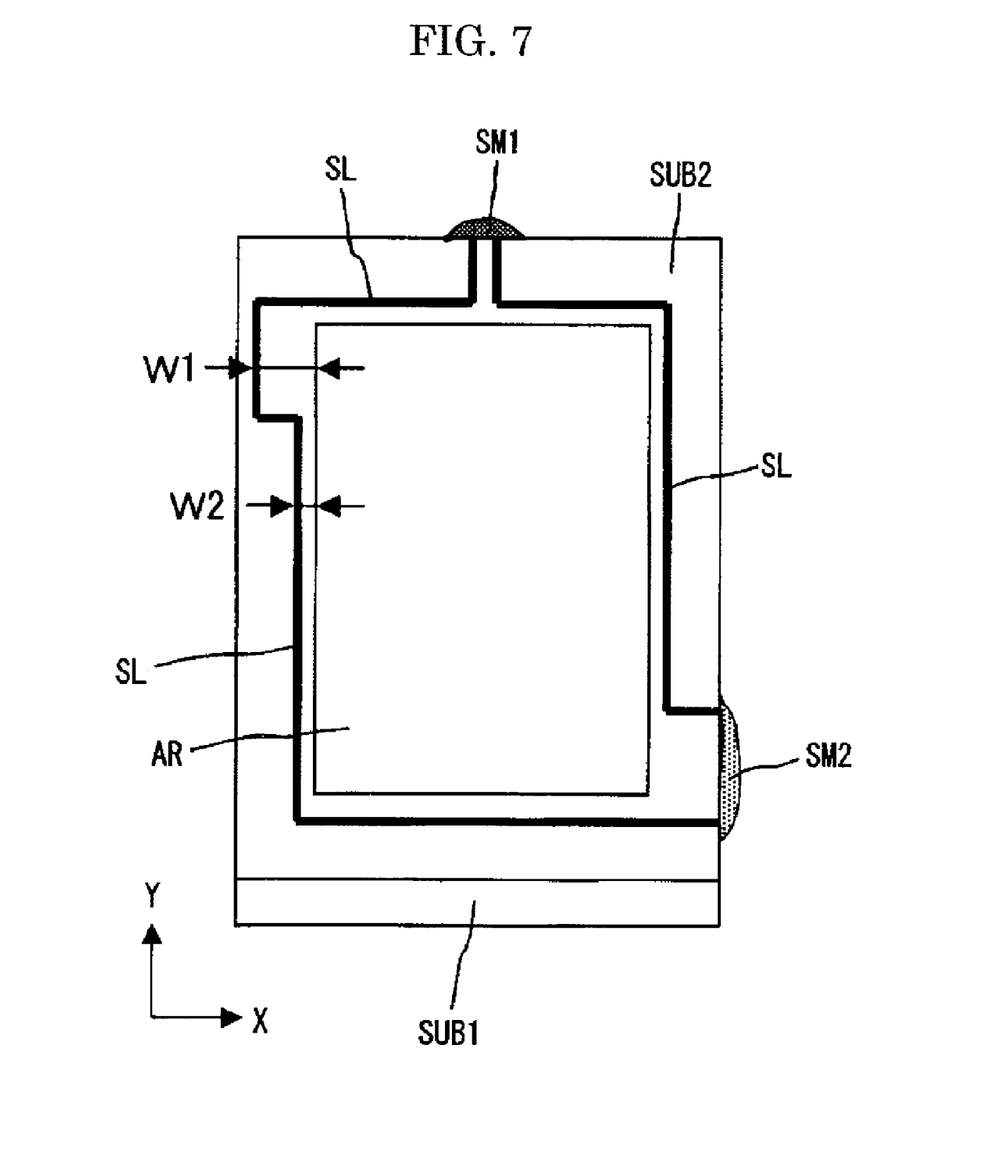
FIG. 7 is a schematic plan diagram showing the configuration of the liquid crystal display device according to another embodiment of the present invention.

Though the liquid crystal display device according to the second embodiment has such a structure that liquid crystal is injected through the opening in the first sealing material in the corner, the invention is not limited to this, and as shown in FIG. 7, for example, the liquid crystal display device may have such a structure that an opening for injecting liquid crystal is provided in the center of the upper portion in the figure, as in the first embodiment.

Figure 8:
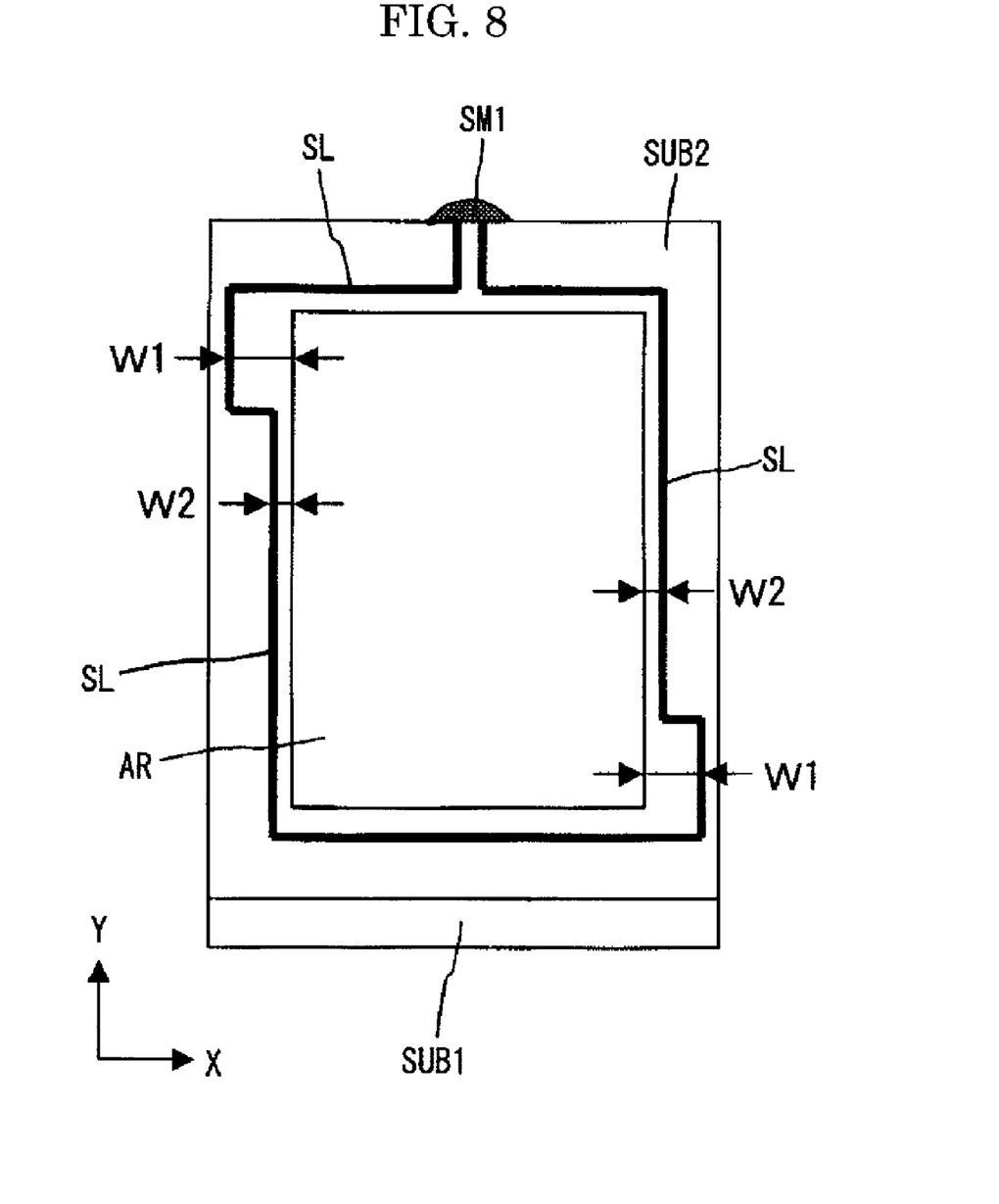
FIG. 8 is a schematic plan diagram showing the configuration of the liquid crystal display device according to still another embodiment of the present invention.

In addition, though the liquid crystal display device according to the third embodiment has such a structure that liquid crystal is injected using ODF, as shown in FIG. 8, for example, an opening for injection liquid crystal may be provided in the center of the upper portion in the figure, as in the first embodiment, using the pattern of the first sealing material SL in the liquid crystal display device according to the third embodiment. In this case, particular effects can be gained, such that it becomes possible to inject liquid crystal without using ODF, and at the same time, light can be prevented from passing through simply by applying a first sealing material SL.

In addition, though in the above described embodiments, the liquid crystal display device is bent so that the first substrate so that it protrudes on the SUB1 side, as shown in FIG. 2A, it may be bent in the opposite direction (that is to say, so that it protrudes on the second substrate SUB2 side). Furthermore, though in the above described embodiments, the liquid crystal display device is bent in the length of the first substrate SUB1 and the second substrate SUB2 and not in the width, the structure allows the liquid crystal display device to be bent in the width instead of in the length.

Though the invention made by the present inventors is concretely described in the above on the basis of embodiments of the invention, the present invention is not limited to these embodiments, and modifications are, of course, possible, so long as the gist of the invention is not deviated from.

What is claimed is:

1. A liquid crystal display device comprising a first substrate in rectangular form, a second substrate in rectangular form which faces said first substrate, liquid crystal that is sandwiched between said first substrate and said second substrate, a display region in rectangular form where a number of pixels are formed, and a sealing material which secures said first substrate and said second substrate to each other and seals said liquid crystal, characterized in that a main surface of said first substrate and a main surface of said second substrate are bent, said sealing material is provided outside said display region and forms a protrusion in at least one corner of said display region, and a distance between a side of said display region facing said protrusion and said sealing material where there is the protrusion is greater than a distance between said side and said sealing material where there is no protrusion.

2. The liquid crystal display device according to claim 1, characterized in that said first substrate and said second substrate are glass substrates having a thickness of 0.2 mm or less.

3. The liquid crystal display device according to claim 1, characterized in that said first substrate and said second substrate are plastic substrates.

4. The liquid crystal display device according to claim 1, characterized in that said first substrate and said second substrate that are positioned so as to face each other are bent so that the first substrate side protrudes.

5. The liquid crystal display device according to claim 1, characterized in that
said first substrate and said second substrate that are positioned so as to face each other are bent so that the second substrate side protrudes.

6. The liquid crystal display device according to claim 1, characterized in that said sealing material is made of a first sealing material having an opening and a second sealing material for closing said opening.

7. The liquid crystal display device according to claim 6, characterized in that
at least one protrusion has an opening in said first sealing material and said opening is closed by said second sealing material in the structure.

8. The liquid crystal display device according to claim 7, characterized in that
said protrusion of which the opening is closed by said second sealing material is used to inject said liquid crystal.

9. The liquid crystal display device according to claim 1, characterized in that
said protrusion is formed in at least one corner on the side of the diagonal line of said display region of which the angle at which the diagonal line crosses the direction in which said liquid crystal is initially aligned is greater.

10. The liquid crystal display device according to claim 9, characterized in that
said protrusion is formed in two corners on the side of the diagonal line of which the crossing angle is greater.

11. The liquid crystal display device according to claim 1, characterized in that
said first substrate has a gate signal line through which a scanning signal is inputted, a drain signal line through which a video signal is inputted, and a common signal line through which a reference signal having a reference potential is inputted,
pixel electrodes are connected to the drain signal lien via thin film transistors, and
a common electrode is connected to said common signal line.

12. The liquid crystal display device according to claim 11, characterized in that
the direction in which said liquid crystal is initially aligned is set to incline relative to the direction in which said drain signal line extends.

* * * * *